Figure 1:
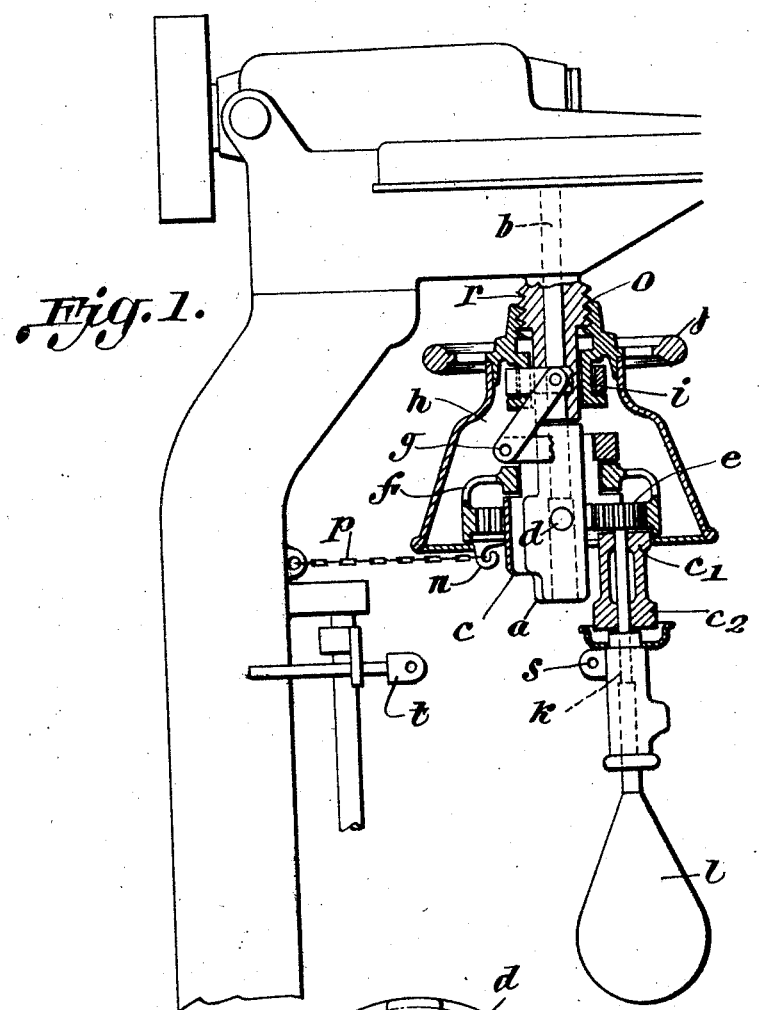

Aug. 21, 1928.

M. M. BOCK 1,681,694

PLANET GEAR

Filed July 8, 1927

Inventor
Max M. Bock
By Knight Bros
Attys

Patented Aug. 21, 1928.

1,681,694

UNITED STATES PATENT OFFICE.

MAX M. BOCK, OF HAMBURG, GERMANY.

PLANET GEAR.

Application filed July 8, 1927, Serial No. 204,328, and in Germany March 11, 1926.

My invention relates to planet gears and it is an object of my said invention to provide a gear of this type the range of which is variable.

To this end, I provide means for varying the angular position of the axes of the planet and orbit gears with respect to the axis of the shaft by which rotation is imparted to one of these parts.

It is another object of my invention to provide means for arresting the planet gear against rotation on its own axis so that the planet gear partakes of orbital movement only.

In the drawing, my novel gear is illustrated as applied to a beater by way of example but it is understood that I am not limited to this particular adaptation of my invention.

Figure 2:
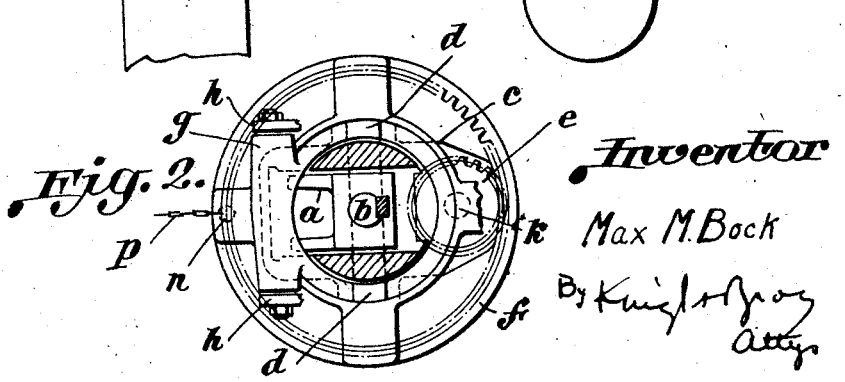

In the drawings,

Fig. 1 is an elevation of my novel gear, partly in section on the axis of the driving shaft and that of the planet gear, Fig. 2 is a transverse section.

Referring now to the drawing, $b$ is the driving shaft to which rotation is imparted by any suitable means, $l$ is the beating arm to which rotation is transferred, $o$ is a bearing on the frame of the machine in which the shaft $b$ is carried, $a$ is a block secured on the shaft $b$, $c$ is a bracket which is held on the block $a$ by trunnions $d$, $c'$ and $c^2$ are bearings formed on one side of the bracket, $k$ is the shaft of the beating arm $l$ which is carried in the bearings, $e$ is a pinion or planet gear at the upper end of the shaft $k$, $f$ is an annulus or orbit gear provided with teeth meshing with the pinion and rotatably carried on the bracket $c$, $n$ is a hook at one side of the orbit gear, and $p$ is a chain which is secured to the frame of the machine at one end and provided with a hook to engage the hook $n$ at its other end.

J is a handwheel the boss of which is seated on a threaded sleeve $r$ of the bearing $o$, $i$ is a ring on the boss of the hand wheel, $h$, $h$ are a pair of links pivoted to trunnions on the ring $i$ at one end, and $g$ is a ring on the bracket $c$ to which ring the other end of each link $h$ is pivoted.

The operation of my improved gear is as follows:

The shaft $b$ is rotated by any suitable means, not shown, the block $a$ rotates with it and imparts its rotation to the bracket $c$ through the trunnions $d$. The orbit gear $f$ is retained by the chain $p$ and the shaft $k$ is rotated bodily about the axis of the system and, through the planet gear $e$, about its own axis. The beater arm $l$ rotates with its shaft $k$.

It will be understood that the radius of the circle on which the beating arm rotates bodily about the axis of the system, may be varied by adjusting the hand wheel $j$ so as to turn the bracket $c$ on its trunnions $d$.

On the other hand, I may secure the shaft $k$ against rotation on its own axis by means of a rod $t$ which may be secured to an eye $s$ on the shaft $k$ so that exclusively orbital movement is imparted to the beating arm upon rotation of the shaft $b$. In this case the chain $p$ will be disconnected from the hook $n$ and the beater $l$ will be driven in an orbital path by rotation of the shaft $b$ acting through trunnions $d$ and member $c$, while the rod $t$ rocks and reciprocates in its supporting bracket.

I claim:

1. A planet gear system comprising a driving shaft and a driven shaft, an orbit gear, means for arresting said orbit gear, means operatively connecting said shafts and comprising a planet gear, and means for varying the relative angle of said shafts comprising means for common swinging of the bearing for the orbit gear with the bearing for the planet gear.

2. A planet gear system comprising a driving shaft and a driven shaft, an orbit gear, releasable means for arresting said orbit gear, means operatively connecting said shafts and comprising a planet gear, means for varying the relative angle of said shafts comprising means for common swinging of the bearing for the orbit gear with the bearing for the planet gear, and means for arresting the planet gear against rotation upon its own axis.

The foregoing specification signed at Hamburg, Germany, this thirteenth day of June, 1927.

MAX M. BOCK.